US010785045B2

(12) United States Patent
Harpur et al.

(10) Patent No.: US 10,785,045 B2
(45) Date of Patent: Sep. 22, 2020

(54) SOCIALLY ENABLED CONSENSUS BLOCKCHAIN SUMMARIZATION

(71) Applicant: International Business Machines Corporation, Armonk, NY (US)

(72) Inventors: Liam S. Harpur, Skerries (IE); Jonathan Dunne, Dungarvan (IE); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 15/861,277

(22) Filed: Jan. 3, 2018

(65) Prior Publication Data

US 2019/0207781 A1 Jul. 4, 2019

(51) Int. Cl.
| | |
|---|---|
| *G06F 40/20* | (2020.01) |
| *H04L 12/18* | (2006.01) |
| *H04L 9/06* | (2006.01) |
| *H04L 29/06* | (2006.01) |
| *H04L 29/08* | (2006.01) |
| *G06F 16/34* | (2019.01) |

(Continued)

(52) U.S. Cl.
CPC ........ *H04L 12/1831* (2013.01); *G06F 16/345* (2019.01); *G06F 40/20* (2020.01); *H04L 9/0637* (2013.01); *H04L 9/3239* (2013.01); *H04L 65/403* (2013.01); *H04L 67/104* (2013.01); *H04L 51/04* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 2014/0162241 | A1* | 6/2014 | Morgia | G06Q 30/02 434/362 |
| 2015/0089399 | A1* | 3/2015 | Megill | H04L 12/1813 715/753 |

(Continued)

OTHER PUBLICATIONS

National Institute of Standards and Technology; The NIST Definition of Cloud Computing; Special Publication 800-145; Dec. 13, 2016; pp. M-7 to M-13.

*Primary Examiner* — Sargon N Nano
*Assistant Examiner* — Christopher B Robinson
(74) *Attorney, Agent, or Firm* — Michael O'Keefe

(57) ABSTRACT

A method includes establishing parameters and objectives for a digital communication session (DCS) regarding a topic, where computing devices are targeted to participate in the DCS. The method further includes determining whether a blockchain exists for the topic and, if so, affiliating the DCS with the blockchain. The method further includes obtaining data pertaining to the DCS from one or more of the computing devices. The method further includes generating a summarization of the DCS based on the data and in accordance with the parameters and objectives. The method further includes sending a request to at least some of the computing devices to validate the summarization. When a desired number of the at least some of the computing devices have validated the summarization, a data block regarding the DCS and the summarization is generated and the blockchain is updated to include the data block.

16 Claims, 10 Drawing Sheets

(51) Int. Cl.
 *H04L 9/32* (2006.01)
 *H04L 12/58* (2006.01)

(56) References Cited

U.S. PATENT DOCUMENTS

| | | | |
|---|---|---|---|
| 2017/0017936 A1* | 1/2017 | Bisikalo | G06Q 20/065 |
| 2017/0048234 A1 | 2/2017 | Lohe et al. | |
| 2017/0103472 A1 | 4/2017 | Shah | |
| 2017/0237569 A1 | 8/2017 | Vandervort | |
| 2017/0243212 A1* | 8/2017 | Castinado | H04L 9/3236 |
| 2017/0323392 A1* | 11/2017 | Kasper | G06Q 40/12 |
| 2019/0182257 A1* | 6/2019 | Lee | G06Q 10/06315 |

\* cited by examiner

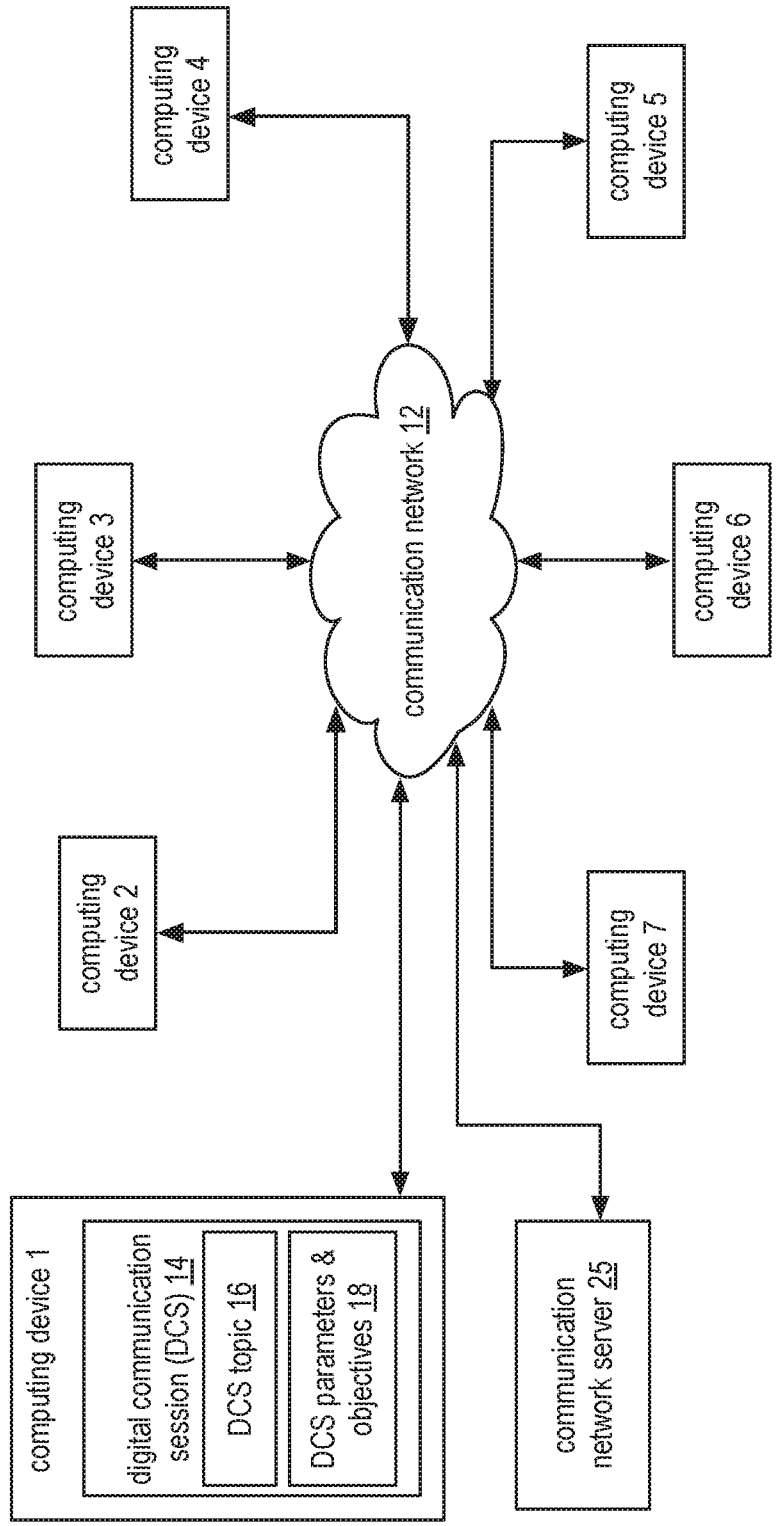

DCS topic blockchain 22

US 10,785,045 B2

SOCIALLY ENABLED CONSENSUS BLOCKCHAIN SUMMARIZATION

BACKGROUND

This present invention relates generally to computer networks and more particularly to blockchain technology.

A blockchain is a shared immutable ledger for recording the history of transactions. A blockchain consists of a continuously growing list of blocks (i.e., records of transactions) that are securely linked, continually reconciled, and shared among authorized participants of a network. Network participants must provide consensus before a new transaction is added to the blockchain. All validated transactions are permanently recorded. Each authorized participant of the network has access rights so that confidential information is shared on a need to know basis. Once recorded, transactions cannot be altered.

The first distributed blockchain was conceptualized in 2008 by Satoshi Nakamoto and implemented as a core component of the worldwide cryptocurrency and digital payment system Bitcoin in 2009 where it serves as the public ledger for all transactions. Bitcoin is designed to transmit cryptocurrency via anonymous transactions that are open and public (i.e., anyone can join and view any transaction that has ever happened on the network). To deter fraudulent activity, Bitcoin implements heavyweight cryptography that requires significant computing power.

Unlike Bitcoin, a business blockchain, such as IBM Blockchain™ and the Linux Foundation's Hyperledger Project provide a permissions network with known identities. Unlike Bitcoin, there is no need for cryptocurrency exchange. Blockchain for business enables enterprises to free up capital flows, lower transaction costs, speed processes, and provide trust and security.

Differences in consensus on low level business details (e.g., digital communication session understanding) can be costly and problematic for businesses. It is common for digital communication session attendees to exit the same session with different viewpoints of what took place. Various actions may be required to confirm and secure clarity after a digital communication session with e-mails, meeting minutes, possible disagreements, and general closure on next steps or actions for specific individuals. Lack of clarity and agreement yield loss of productivity. Additionally, there is often too much detail to input into a scalable system with human verification.

SUMMARY

Embodiments of this invention disclose a computer-implemented method, system, and a computer program product for socially enabled blockchain summarization. Parameters and objectives for a digital communication session regarding a topic are established by a computing device affiliated with a communication network. A plurality of computing devices affiliated with the communication network are participants in the digital communication session. The computing device determines whether a blockchain exists for the topic and, when a blockchain exists, affiliates the digital communication session with the blockchain. The computing device obtains data pertaining to the digital communication session from one or more of the plurality of computing devices provides the data. The computing device generates a summarization of the digital communication session based on the data and in accordance with the parameters and objectives. The computing device sends a request to at least some of the plurality of the computing devices to validate the summarization. When a desired number of the at least some of the plurality of computing devices have validated the summarization, the computing device generates a data block regarding the digital communication session and the summarization and updates the blockchain to include the data block.

BRIEF DESCRIPTION OF THE DRAWING(S)

FIG. 1 is a schematic block diagram of an embodiment of a computing network according to various embodiments of the present invention;

DETAILED DESCRIPTION

Figure 2A:
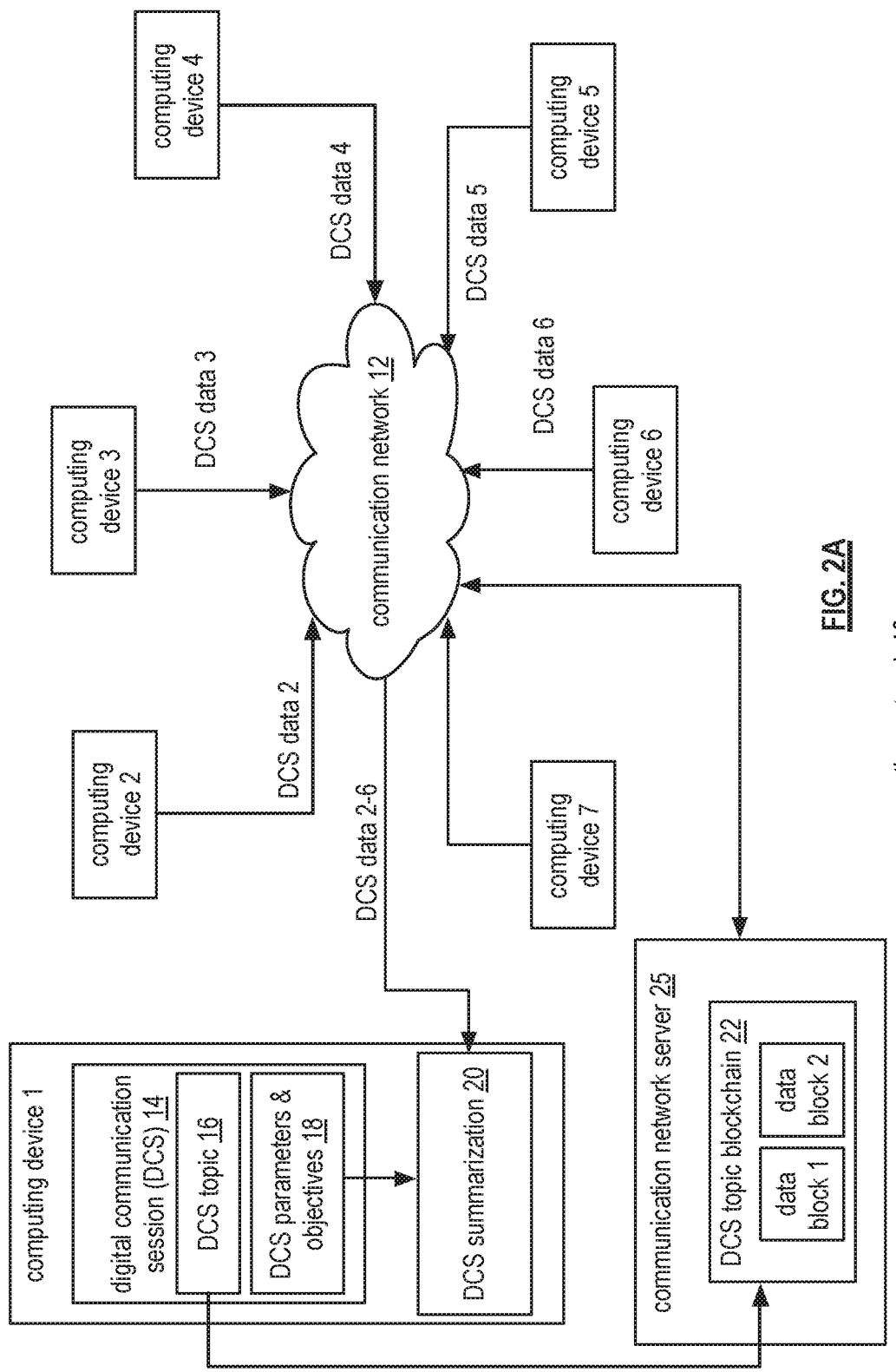
FIGS. 2A-2B are schematic block diagrams of an example of creating and validating a digital communication session summarization using blockchain technology within a computing network according to various embodiments of the present invention.

FIG. 1 is a schematic block diagram of an embodiment of a computing network 10 that includes a plurality of computing devices 1-7 and communication network server 25 affiliated with a communication network 12. Communication network 12 may include one or more wireless and/or wire lined communication systems; one or more non-public intranet systems and/or public internet systems; and one or more local area networks (LAN) and/or wide area networks (WAN). Communication network server 25 may include one or more processing modules and a database and may be one or more of an application server, communications server, computing server, file server, and a database server (e.g., web-based database server, cloud server, etc.) in accordance with an embodiment of the present invention. The computing network 10 may be a cloud computing environment where computing devices 1-7 are cloud computing nodes and communication network server 25 is a cloud server. Cloud computing environments are discussed in greater detail with reference to FIGS. 6-8.

Computing devices 1-7 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core in accordance with an embodiment of the present invention. A fixed computing device may be a computer (PC), a computer server, a cable set-top box, a satellite receiver, a television set, a printer, a fax machine, home entertainment equipment, a video game console, and/or any type of home or office computing equipment in accordance with an embodiment of the present invention.

In this example, a digital communication session (DCS) 14 administrator, presenter, and/or coordinator that is operating computing device 1 establishes parameters and objectives 18 (e.g., parameters and objectives 18 are input via user interface and/or obtained from computing device 1 memory, etc.) for DCS 14 regarding a DCS topic 16. The digital communication session may be any type of digital communication between two or more participants where a record of the digital communication session is desirable. For example, the digital communication session may include email, webinar, web meetings, video conferencing, phone call, forums, and/or any other type of digital meeting and/or event. The DCS topic 16 is the subject matter of the digital communication session 14. For example, the DCS topic 16 may be a broad subject matter such as budgeting, developing a new product, marketing, etc. Several digital communication sessions may be executed for one topic. The DCS topic 16 may consist of narrow subject matter such as resolving a specific personnel issue where only one or two digital communication sessions are executed to cover the topic. DCS parameters and objectives 18 include at least one of a purpose, definition, an agenda, categorization, rules, time, place, and completion criteria (e.g., what needs to occur to finish the digital communication session) for the digital communication session 14.

Computing devices 2-7 are operated by participants in the digital communication session 14. For example, computing device 1 is operated by a system administrator and/or an administrative assistant device and computing devices 2-7 are operated by attendees (e.g., employees of a business) of the digital communication session 14 (e.g., on online business meeting). As another example, computing device 1 may also be operated by a participant in the digital communication session 14. For example, computing device 1 is operated by the digital communication session 14 presenter and/or coordinator who is also a participant (e.g., a business manager).

Figure 2B:
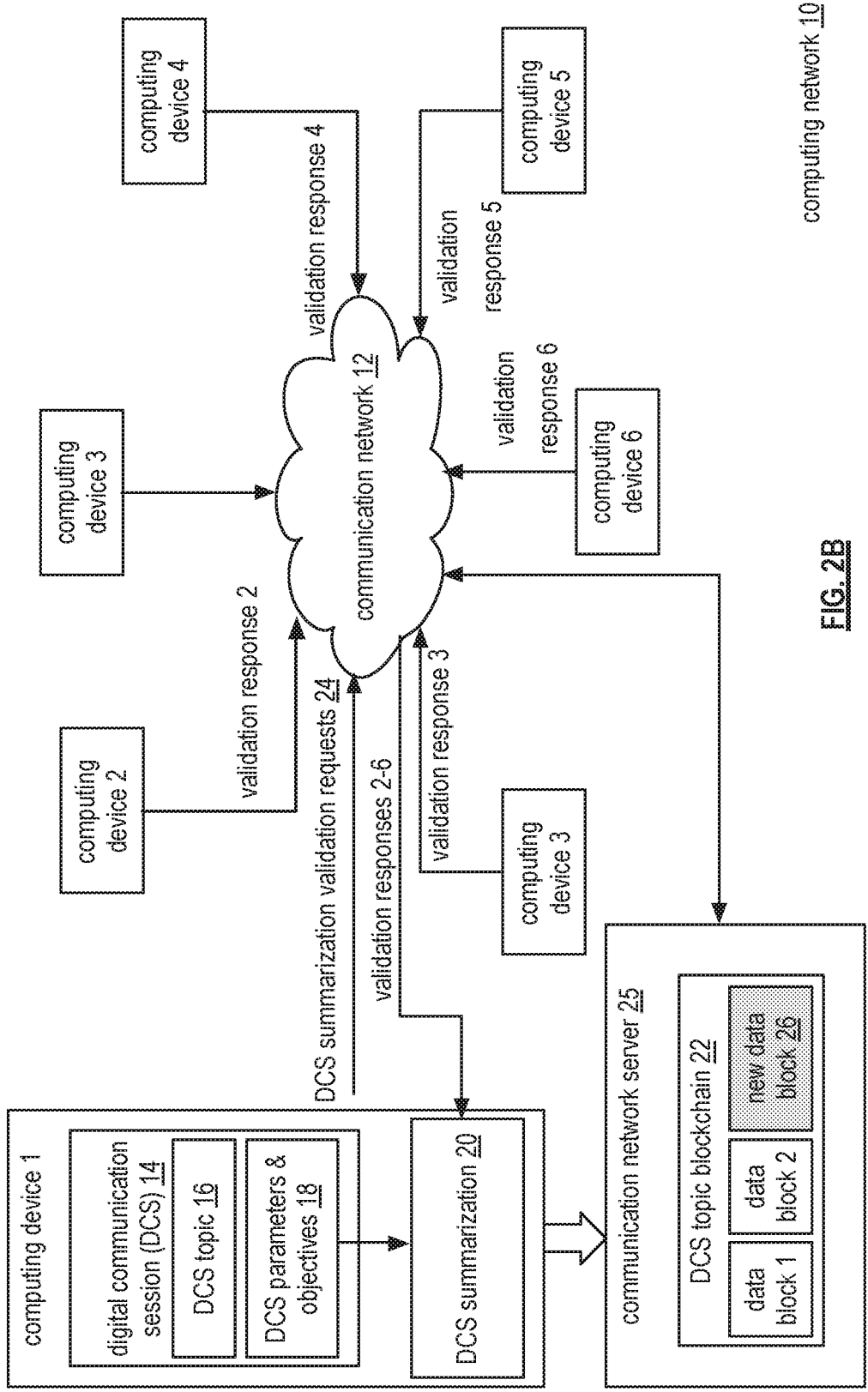

FIGS. 2A-2B are schematic block diagrams of an example of creating and validating a digital communication session summarization using blockchain technology within a computing network 10. FIG. 2A depicts a digital communication session (DCS) 14 administrator, presenter, and/or coordinator that is operating computing device 1 establishing parameters and objectives 18 (e.g., parameters and objectives 18 are input via user interface and/or obtained from computing device 1 memory, etc.) for a digital communication session (DCS) 14 regarding a DCS topic 16 as discussed with reference to FIG. 1. For example, the DCS topic 16 may be development of a new product, and DCS 14 is an online conference regarding the design of a key component of the product. DCS parameters and objectives 18 for DCS 14 may include a purpose (e.g., select one of three design options for the key component), time (e.g., 9:00-10:30 AM), place (e.g., website and email link for online conference access), an agenda (e.g., 9:00-9:30 AM: lead designer presents three design options for the product component, 9:30-10:00 AM: accounting presents financing considerations of the design options, 10:00-10:30 AM: open discussion of design options), and completion criteria (e.g., one of three design options is selected for production).

Computing devices 2-7 are participants in DCS 14. For example, using the example that DCS topic 16 is development of a new product, computing device 2 is a tablet operated by a lead designer, computing device 3 is a laptop computer operated by a designer, computing device 4 is a smartphone operated by a manager, computing device 5 is an desktop computer operated by an engineer, and computing devices 6 and 7 are laptop computers operated by accountants.

To gain a consensus among participants as to whether the DCS parameters and objectives 18 were achieved and to record the most accurate summarization of the digital communication session possible, the computing network 10 implements blockchain technology. As a result of the operator of computing device 1 preparing and/or initiating DCS 14, computing device 1 determines whether a blockchain exits for DCS topic 16. An existing DCS topic blockchain may be stored in communication network server 25, one or more of the computing devices 1-7, and/or memory available to one or more of the computing devices 1-7 and/or the communication network server 25. For example, DCS 14 may be the third digital communication session regarding the DCS topic 16 (e.g., development of the new product). As an example, a first digital communication session was held regarding the new product (e.g., overall design) and a second digital communication session was held regarding the new product (e.g., budgeting).

In this example, computing device 1 accesses communication network server 25 via communication network 12 to determine whether communication network server 25 stores DCS topic blockchain 22. Computing device 1 determines that DCS topic blockchain 22 already exists for DCS topic 16 and that DCS topic blockchain 22 contains data block 1 (including a summarization of the first digital communication session) and data block 2 (including a summarization of the second digital communication session). Computing device 1 affiliates DCS 14 with DCS topic blockchain 22.

If a blockchain does not exist for the topic, computing device 1 obtains (e.g., creates, retrieves from another computing device, etc.) a new blockchain for DCS topic 16. Participants operating computing devices 2-6 submit data (e.g., DCS data 2-6) to computing device 1 pertaining to the digital communication session (e.g., before, during, and/or after the occurrence of DCS 14) and execution thereof. In this example computing device 7 participant was present for DCS 14 but did not submit data (e.g., the participant's device was unable to submit data). If computing device 1 is also operated by a participant, computing device 1's operator submits data pertaining to DCS 14 and execution thereof to computing device 1 as well. As an example, participants operating computing devices 2-6 submit data as to what occurred during digital communication session 14 and what (if any) objectives were achieved. Computing device 1 participant and/or administrator generates a DCS summarization 20 based on DCS data 2-6 and in accordance with the DCS parameters and objectives 18 (e.g., a summary of what participants believe occurred during the session and whether that summary aligns with the set DCS parameters and objectives 18).

As an example of generating the DCS summarization 20, computing device 1 connects to and leverages natural language processing/deep learning software (e.g., Watson Alchemy API) to analyze the input data (e.g., DCS data 2-6). Computing device 1 further implements a longitudinal summarization analysis and learning system (e.g., Naive Bayes) to learn the desired summarization levels of individuals and group participants (e.g., while computing device 2 prefers summarization level 3 for sub-topic "NP4," all other participants prefer summarization level 5. Therefore, summarization level 5 will be used for the blockchain entry).

DCS summarization 20 includes one or more of an attendee list, topic information, DCS parameter and objectives 18, session data (e.g., generated and/or presented during the session), items agreed to, items not agreed to, follow up action items, a next digital communication session regarding DCS topic 16, and information regarding the next digital communication session. Session data includes documents, presentation slides, spreadsheets, image files, audio files, video files etc.

DCS summarization 20 may include a plurality of different iterations of summarizations of the digital communication session 14 based on DCS data 2-6 and in accordance with the parameters and objectives 18. If so, participants operating computing devices 2-6 are requested to select one of the iterations. When a consensus number for a particular iteration of the plurality of different iterations is met, the particular iteration is set as the DCS summarization 20. When a consensus number for a particular iteration of the plurality of different iterations is not met, computing device 1 modifies the plurality of iterations of summarizations. When a consensus number for a modified iteration of the modified plurality of different iterations is met, the modified iteration is set as the DCS summarization 20.

FIG. 2B depicts a digital communication session (DCS) 14 administrator, presenter, and/or coordinator that is operating computing device 1 sending DCS summarization validation requests 24 to DCS 14 participants operating computing devices 2-6. When a desired number of DCS 14 participants operating computing devices 2-6 have validated the DCS summarization 20, computing device 1 generates new data block 26 regarding the digital communication session 14 and the DCS summarization 20. The computing device 1 updates DCS topic blockchain 22 to include the new data block 26. Updating DCS topic blockchain 22 is discussed in greater detail with reference to FIGS. 3A and 3B.

When a desired number (e.g., a consensus number, threshold number, etc.) of participants operating computing devices 2-6 have not validated DCS summarization 20, computing device 1 generates a modified summarization of the digital communication session 14 based on the DCS data 2-6 and in accordance with the parameters and objectives 18 and retry logic. For example, the retry logic may specify to rework the summarization iteratively until all participants agree to a modified summarization. Computing device 1 sends summarization validation requests to computing devices 2-6 to validate the modified summarization. When a desired number of participants operating computing devices 2-6 have validated the modified summarization, computing device 1 generates a different data block regarding the digital communication session 14 and the modified summarization. Computing device 1 updates blockchain 22 to include the different data block.

Figure 3A:
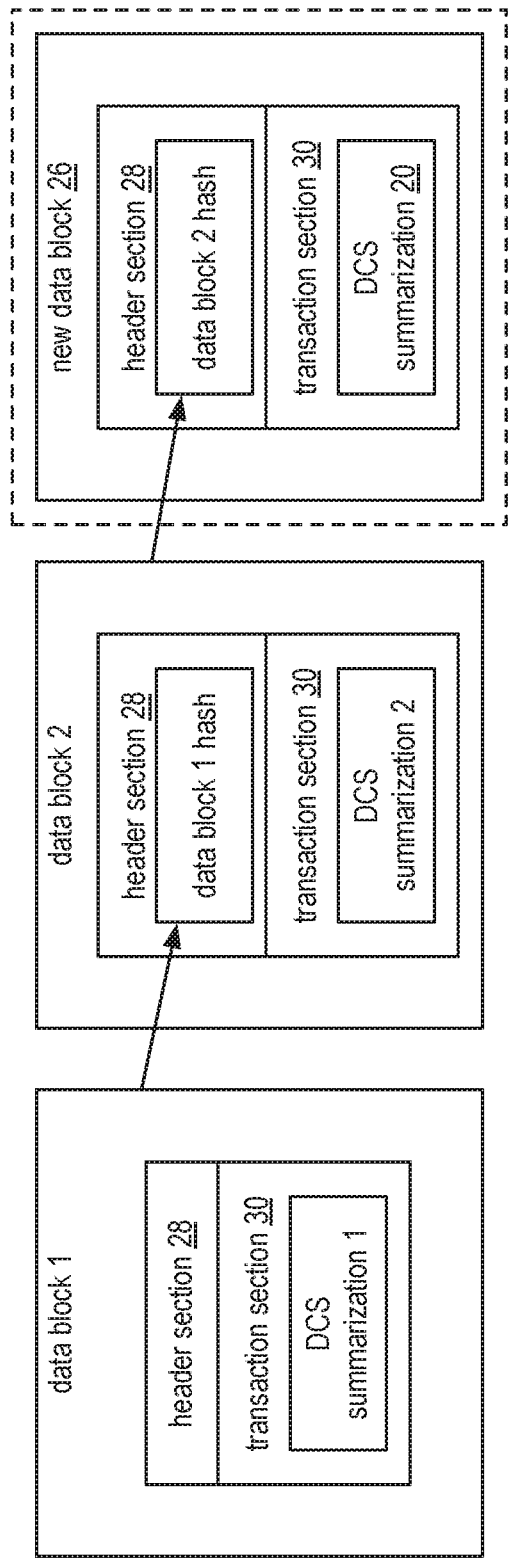
FIGS. 3A-3B are examples of updating a digital communication session topic blockchain according to various embodiments of the present invention.

FIG. 3A is an example of updating a digital communication session (DCS) topic blockchain 22 to include new data block 26. Each data block in the DCS topic blockchain 22 includes a header section 28 and a transaction section 30. Each header section 28 includes data block identifying information (e.g., a hash, nonce, etc.). When a data block is added to the DCS topic blockchain 22, the header section 28 further includes identifying information of a previous data block in DCS topic blockchain 22 (e.g., the new data block hash includes the hash of the previous data block) thus linking a new data block to a previous data block. The transaction section 30 includes information regarding the DCS summarization of the particular digital communication session.

DCS summarization 20 includes one or more of an attendee list, topic information, DCS parameter and objectives 18, session data (e.g., generated and/or presented during the session), items agreed to, items not agreed to, follow up action items, a next digital communication session regarding DCS topic 16, and information regarding the next digital communication session. Session data includes documents, presentation slides, spreadsheets, image files, audio files, video files etc. The transaction section 30 may include one or more sections for one or more portions of DCS summarization 20 information (e.g., one section for overall summarization and another section for session data uploads (e.g., documents, presentation slides, etc.)).

Here, data block 1 is the first data block in DCS topic blockchain 22. Data block 1's transaction section 30 includes information regarding DCS summarization 1 (the summarization of the first digital communication session for the topic). Data block 2's header section 28 includes a hash (and/or other identifying information) of data block 1 thus linking data block 2 to data block 1. Data block 2's transaction section 30 includes information regarding DCS summarization 2 (the summarization of the second digital communication session for the topic).

As discussed with reference to FIGS. 2A-2B, new data block 26 is generated regarding DCS 14 and DCS summarization 20. To generate new data block 26, computing device 1 generates new data block 26's header section 28 to include identifying information (e.g., a hash, nonce, etc.) and generates new data block 26's transaction section 30 to include information regarding DCS summarization 20.

To update DCS topic blockchain 22, computing device 1 adds new data block 26 to DCS topic blockchain 22 via a secure chain of custody to reflect an updated DCS topic blockchain 22 that includes new data block 26. For example, computing device 1 adds a hash (and/or other identifying information) of data block 2 to new data block 26's header section 28 thus linking new data block 26 to data block 2 as well as data block 1. Computing device 1 publishes the updated DCS topic blockchain 22 to communication network server 25 where it is transparent to all authorized viewers via the communication network 12. Alternatively, DCS topic blockchain 22 may be updated directly on one or more of the computing devices 1-7 (and/or other authorized users), and/or on the memory available to one or more of the computing devices 1-7 and/or the communication network server 25 (e.g., when one or more of the computing devices 1-7, and/or to the memory available to one or more of the computing devices 1-7 and/or the communication network server 25 stores the DCS topic blockchain 22).

Figure 3B:
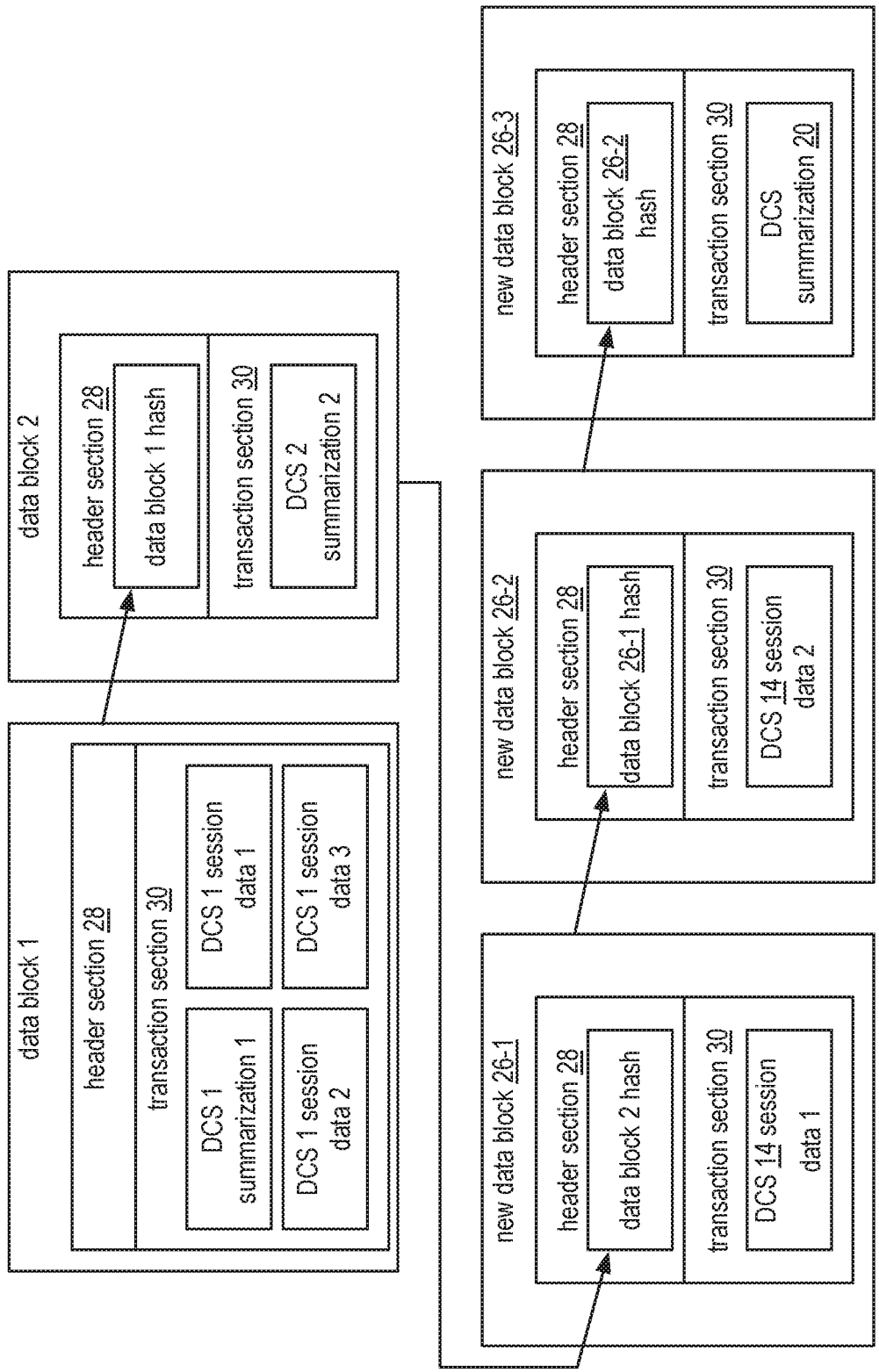

FIG. 3B is an example of updating a digital communication session (DCS) topic blockchain 22 to include new data blocks 26-1 through 26-3. Each data block in the DCS topic blockchain 22 includes a header section 28 and a transaction section 30. Each header section 28 includes data block identifying information (e.g., a hash, nonce, etc.). When a data block is added to the DCS topic blockchain 22, the header section 28 further includes identifying information of a previous data block in DCS topic blockchain 22 (e.g., the new data block hash includes the hash of the previous data block) thus linking a new data block to a previous data block. The transaction section 30 includes information regarding the DCS summarization of the particular digital communication session.

DCS summarization 20 includes one or more of an attendee list, topic information, DCS parameter and objectives 18, session data (e.g., generated and/or presented during the session), items agreed to, items not agreed to, follow up action items, a next digital communication session regarding DCS topic 16, and information regarding the next digital communication session. Session data includes documents, presentation slides, spreadsheets, image files, audio files, video files etc. The transaction section 30 may include one or more sections for one or more portions of DCS summarization 20 information (e.g., one section for overall summarization and another section for session data uploads (e.g., documents, presentation slides, etc.)). Further, one or more new data blocks (e.g., new data blocks 26-1 through 26-3) may be added to DCS topic blockchain 22 to fully represent DCS 14 and DCS summarization 20.

Here, data block 1 is the first data block in DCS topic blockchain 22. Data block 1's transaction section 30 includes information regarding DCS summarization 1 (the summarization of the first digital communication session for the topic). Data block 1's transaction section 30 further includes sections for DCS 1 session data 1-3. For example, DCS summarization 1 may include a summary of the information contained in the session data 1-3 whereas session data 1-3 include the actual data files presented (e.g., presentation slides, documents, etc.).

Data block 2's header section 28 includes a hash (and/or other identifying information) of data block 1 thus linking data block 2 to data block 1. Data block 2's transaction section 30 includes information regarding DCS summarization 2 (the summarization of the second digital communication session for the topic).

Here, new data blocks 26-1 through 26-3 are generated regarding DCS 14 and DCS summarization 20. Computing device 1 generates new data block 26-1 header section 28 to include a hash (and/or other identifying information) of data block 2 thus linking new data block 26-1 to data block 2. Computing device 1 generates new data block 26-1's transaction section 30 to include information regarding DCS summarization 20. Here, new data block 26-1's transaction section 30 includes DCS 14 session data 1 (e.g., presentation slides, documents, etc.).

Computing device 1 generates new data block 26-2 header section 28 to include a hash (and/or other identifying information) of new data block 26-1 thus linking new data block 26-2 to new data block 26-1. Computing device 1 generates new data block 26-2's transaction section 30 to include information regarding DCS summarization 20. Here, new data block 26-2's transaction section 30 includes DCS 14 session data 2 (e.g., presentation slides, documents, etc.).

Computing device 1 generates new data block 26-3 header section 28 to include a hash (and/or other identifying information) of new data block 26-2 thus linking new data block 26-3 to new data block 26-2. Computing device 1 generates new data block 26-3's transaction section 30 to include information regarding DCS summarization 20.

To update DCS topic blockchain 22, computing device 1 adds new data blocks 26-1 through 26-3 to DCS topic blockchain 22 via a secure chain of custody to reflect an updated DCS topic blockchain 22 that includes new data blocks 26-1 through 26-3. Computing device 1 publishes the updated DCS topic blockchain 22 to communication network server 25 where it is transparent to all authorized viewers via the communication network. Alternatively, DCS topic blockchain 22 may be updated directly on one or more of the computing devices 1-7 (and/or other authorized users), and/or on the memory available to one or more of the computing devices 1-7 and/or the communication network server 25 (e.g., when one or more of the computing devices 1-7, and/or to the memory available to one or more of the computing devices 1-7 and/or the communication network server 25 stores the DCS topic blockchain 22).

Figure 4:
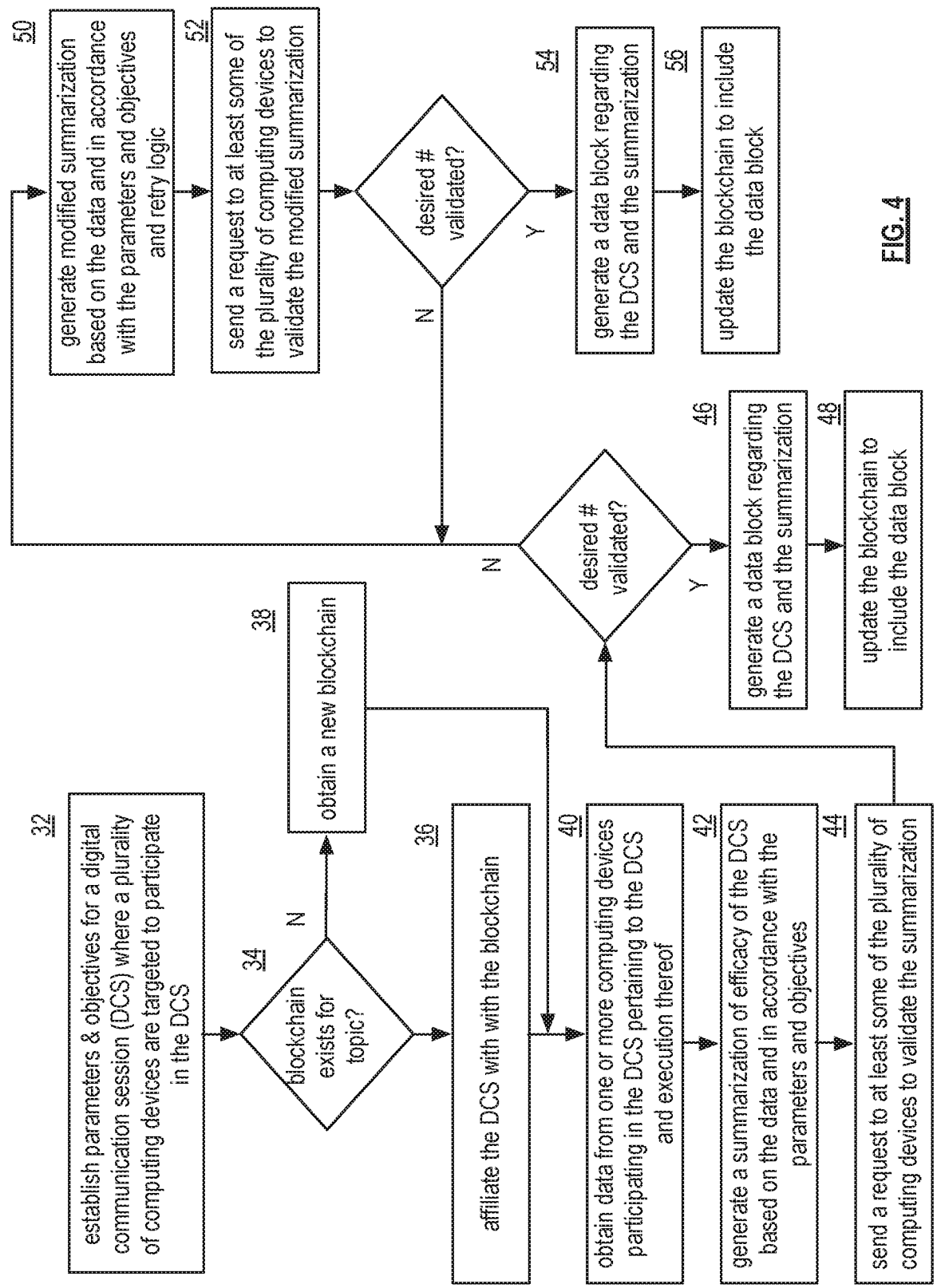
FIG. 4 is a flowchart of a method of creating and validating a digital communication session summarization using blockchain technology according to various embodiments of the present invention.

FIG. 4 is a flowchart of a method of creating and validating a digital communication session summarization using blockchain technology. A digital communication session (DCS) 14 administrator, presenter, and/or coordinator that is operating a computing device (e.g., computing device 1) affiliated with a communication network 12 establishes parameters and objectives 18 (e.g., parameters and objectives 18 are input via user interface and/or obtained from computing device 1 memory, etc.) for DCS 14 regarding a DCS topic 16 where a plurality of participants in the DCS 14 operate a plurality of computing devices (e.g., computing devices 2-7) affiliated with the communication network 12 (at step 32). The computing device 1 may be a computing device of the plurality of computing devices participating in the digital communication session. For example, computing device 1 is operated by the digital communication session 14 presenter and/or coordinator who is also a participant (e.g., a business manager).

The digital communication session may be any type of digital communication between two or more participants where a record of the digital communication session is desirable. For example, the digital communication session may include email, webinar, web meetings, video conferencing, phone call, forums, and/or any other type of digital meeting and/or event. The topic may be a broad subject matter such as budgeting, developing a new product, marketing, etc. Several digital communication sessions may be executed for one broad topic. The topic may consist of narrow subject matter such as resolving a specific personnel issue where only one or two digital communication sessions are executed to cover the topic. The parameters and objectives for the digital communication session include at least one of a purpose, definition, an agenda, categorization, rules, time, place, and completion criteria (e.g., what needs to occur to finish the digital communication session).

As a result of the operator of computing device 1 preparing and/or initiating DCS 14, computing device 1 determines whether a blockchain exits for DCS topic 16 (at step 34). For example, computing device 1 accesses communication network server 25 via communication network 12 to determine whether communication network server 25 stores DCS topic blockchain 22. Computing device 1 determines that DCS topic blockchain 22 already exists for DCS topic 16 and that DCS topic blockchain 22 contains data block 1 (including a summarization of the first digital communication session) and data block 2 (including a summarization of the second digital communication session).

When the blockchain exists for the topic, computing device 1 affiliates DCS 14 with DCS topic blockchain 22 (at step 36). When the blockchain does not exist for the topic, computing device 1 obtains (e.g., creates, retrieves from another computing device, etc.) a new blockchain for DCS topic 16 (at step 38). Whether proceeding from step 36 or 38, participants operating computing devices 2-6 submit data (e.g., DCS data 2-6) to computing device 1 pertaining to the digital communication session (e.g., before, during, and/or after the occurrence of DCS 14) and execution thereof (at step 40).

Computing device 1 participant and/or administrator generates a DCS summarization 20 based on DCS data 2-6 and in accordance with the DCS parameters and objectives 18 (e.g., a summary of what participants believe occurred during the session and whether that summary aligns with the set DCS parameters and objectives 18) (at step 42). For example, the computing device (e.g., computing device 1)

connects to and leverages natural language processing/deep learning software (e.g., Watson Alchemy API) to analyze the data. The computing device 1 further implements a longitudinal summarization analysis and learning system (e.g., Naive Bayes) to learn the desired summarization levels of individuals and group participants (e.g., Joe prefers summarization level 3 for sub-topic "NP4," all other participants prefer summarization level 5 therefore summarization level 5 will be used for the blockchain entry). The summarization includes one or more of an attendee list, topic information, the parameters, the objectives, session data (e.g., generated and/or presented during the session), items agreed to, items not agreed to, follow up action items, a next digital communication session regarding the topic, and information regarding the next digital communication session. Session data includes documents, presentation slides, spreadsheets, image files, audio files, video files etc.

The summarization may include a plurality of different iterations of summarizations of the digital communication session based on the DCS data 2-6 and in accordance with the parameters and objectives 18. If so, participants operating computing devices 2-6 are requested to select one of the iterations. When a consensus number for a particular iteration of the plurality of different iterations is met, the particular iteration is set as the summarization. When a consensus number for a particular iteration of the plurality of different iterations is not met, the computing device modifies the plurality of iterations of summarizations. When a consensus number for a modified iteration of the modified plurality of different iterations is met, the modified iteration is set as the summarization.

The administrator, presenter, and/or coordinator that is operating computing device 1 sends DCS summarization validation requests 24 to DCS 14 participants operating computing devices 2-6 (at step 44). When a desired number of DCS 14 participants operating at least some of the plurality of computing devices have validated the summarization, the method continues with step 46 where the computing device (e.g., computing device 1) generates a data block regarding the digital communication session and the summarization. The computing device generates the data block by generating a header section and a transaction section of the data block. The header section includes identification information (e.g., a nonce, hash, etc.) and the transaction section includes information regarding the summarization.

The method continues with step 48 where the computing device 1 updates the blockchain to include the data block. The computing device updates the blockchain to include the data block by adding the data block to the blockchain via a secure chain of custody to reflect an updated blockchain that includes the data block (e.g., a hash of a previous block is included in the header information of the data block). Computing device 1 publishes the updated DCS topic blockchain 22 to communication network server 25 where it is transparent to all authorized viewers via the communication network. Alternatively, the DCS topic blockchain may be sent directly to one or more of the computing devices 1-7 (and/or other authorized users), and/or to the memory available to one or more of the computing devices 1-7 and/or the communication network server 25. Updating the blockchain is discussed in greater detail with reference to FIGS. 3A and 3B.

When a desired number of participants operating the at least some of the plurality of computing devices have not validated the summarization, computing device 1 generates a modified summarization of the digital communication session 14 based on the DCS data 2-6 and in accordance with the parameters and objectives 18 and retry logic (at step 50). For example, the retry logic may specify to rework the summarization iteratively until all participants agree to a modified summarization. Computing device 1 sends summarization validation requests to computing devices 2-6 to validate the modified summarization (at step 52).

When a desired number of participants operating the at least some of the plurality of computing devices have validated the modified summarization, computing device 1 generates a different data block regarding the digital communication session 14 and the modified summarization (at step 54). Computing device 1 updates blockchain 22 to include the different data block (at step 56). When a desired number of the at least some of the plurality of computing devices have not validated the modified summarization, the method branches back to step 50.

Figure 5:
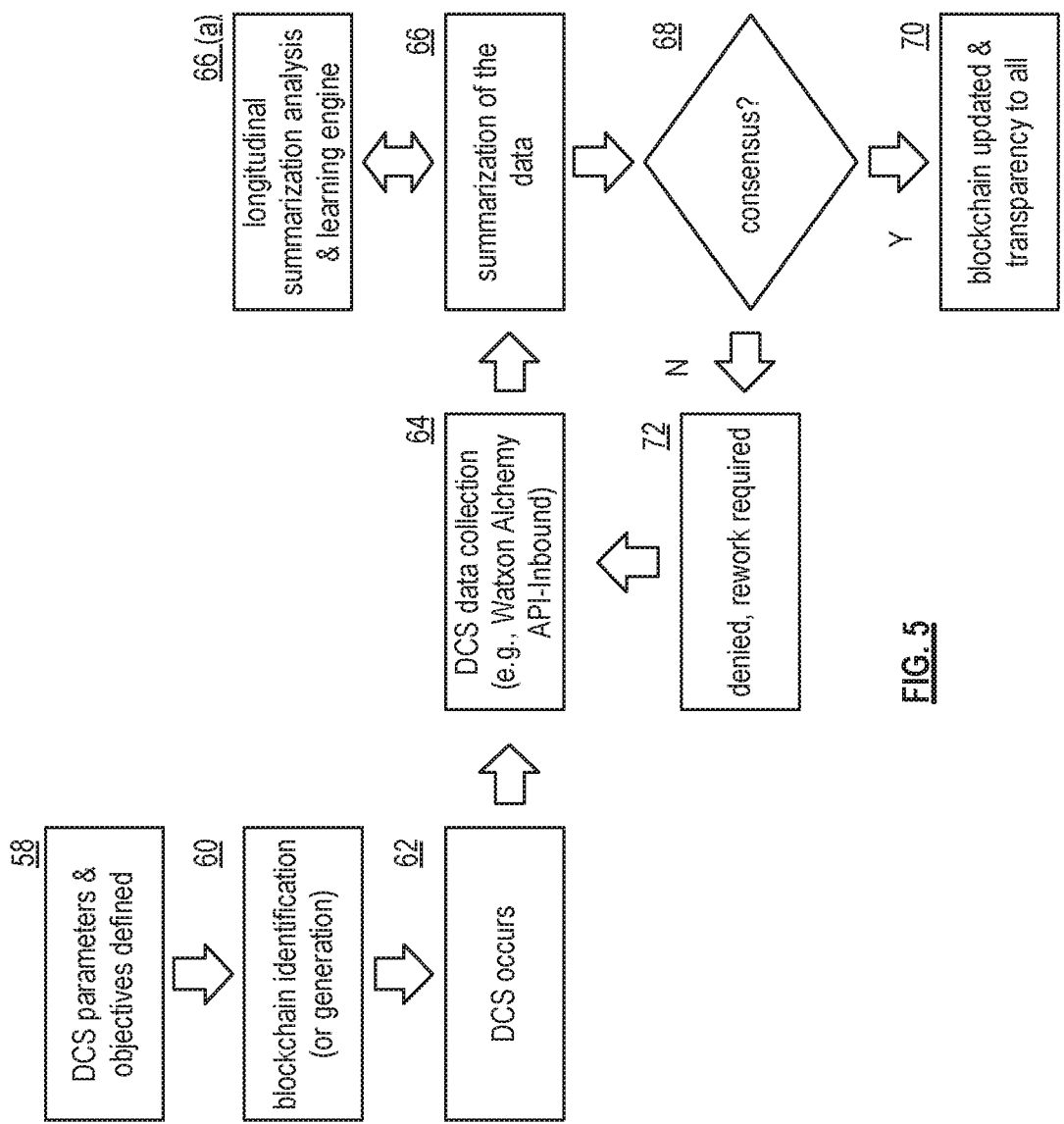
FIG. 5 is a flowchart of a method of a socially enabled consensus via blockchain summarization according to various embodiments of the present invention.

FIG. 5 is a flowchart of a method of a socially enabled consensus via blockchain summarization. At step 58, digital communication session (DCS) parameters and objectives are defined (e.g., a digital communication session (DCS) 14 administrator, presenter, and/or coordinator that is operating computing device 1 establishes parameters and objectives 18 (e.g., parameters and objectives 18 are input via user interface and/or obtained from computing device 1 memory, etc.) for DCS 14 regarding a DCS topic 16). The digital communication session may include email, webinar, web meetings, video conferencing, phone call, forums, and/or any other type of digital meeting and/or event. The DCS parameters and objectives are defined prior to the digital communication session and include at least one of a purpose, definition, an agenda, categorization, rules, time, place, and completion criteria (e.g., what needs to occur to finish the digital communication session) for the digital communication session.

Computing device 1 accesses communication network server 25, one or more of the computing devices 1-7, and/or memory available to one or more of the computing devices 1-7 and/or the communication network server 25 via communication network 12 to determine whether a target blockchain exists within any of those locations. If the target blockchain does not exist for the topic, computing device 1 obtains (e.g., creates, retrieves from another computing device, etc.) a new blockchain for DCS topic 16 (at step 60). The method continues with step 62 where the digital communication session occurs. After the DCS occurs, participants operating computing devices submit data to computing device 1 pertaining to the digital communication session (e.g., before, during, and/or after the occurrence of DCS 14) and execution thereof (at step 62). The data includes actual agenda items covered, documented event items from users, any actions required based on the event, summarization points from individual participants, and any additional items. Natural language processing/deep learning software (e.g., Watson Alchemy API) can be used to collect the input data and analyze the data to create a summarization of the digital communication session.

Computing device 1 participant and/or administrator generates a DCS summarization 20 based on received participant data and in accordance with the DCS parameters and objectives 18 (e.g., a summary of what participants believe occurred during the session and whether that summary aligns with the set DCS parameters and objectives 18) (at step 66). For example, a natural language processing/deep learning software (e.g., Watson Alchemy API) is leveraged to analyze the input data. At step 66(a), computing device 1 implements longitudinal summarization analysis and learning system (e.g., Naive Bayes) to learn the desired summarization levels of individuals and group participants (e.g., Joe prefers summarization level 3 for sub-topic "J2EE," all other participants prefer summarization level 5. Therefore, summarization level 5 will be used for the blockchain entry).

Computing device 1 determines participant consensus on the proposed summarization (at step 68). If consensus is achieved, the blockchain is updated and made visible to all authorized parties (at step 70). If consensus is not achieved, the summarization is denied and rework is required (at step 72).

Figure 6:
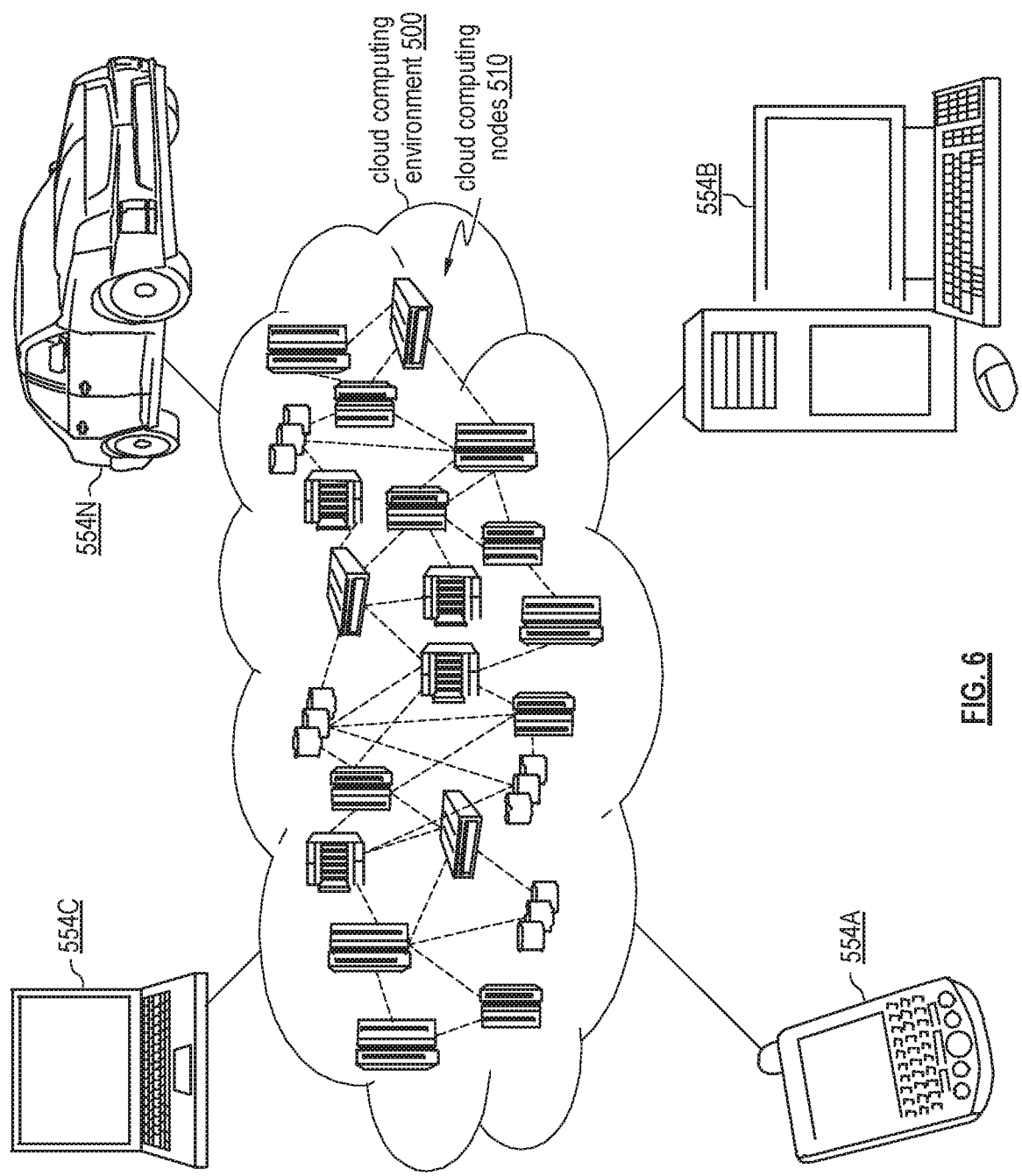
FIG. 6 depicts a cloud computing environment according to various embodiments of the present invention.

FIG. 6 depicts a cloud computing environment 500. As shown, cloud computing environment 500 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 554A-N shown in FIG. 6 are intended to be illustrative only and that computing nodes 510 and cloud computing environment 500 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
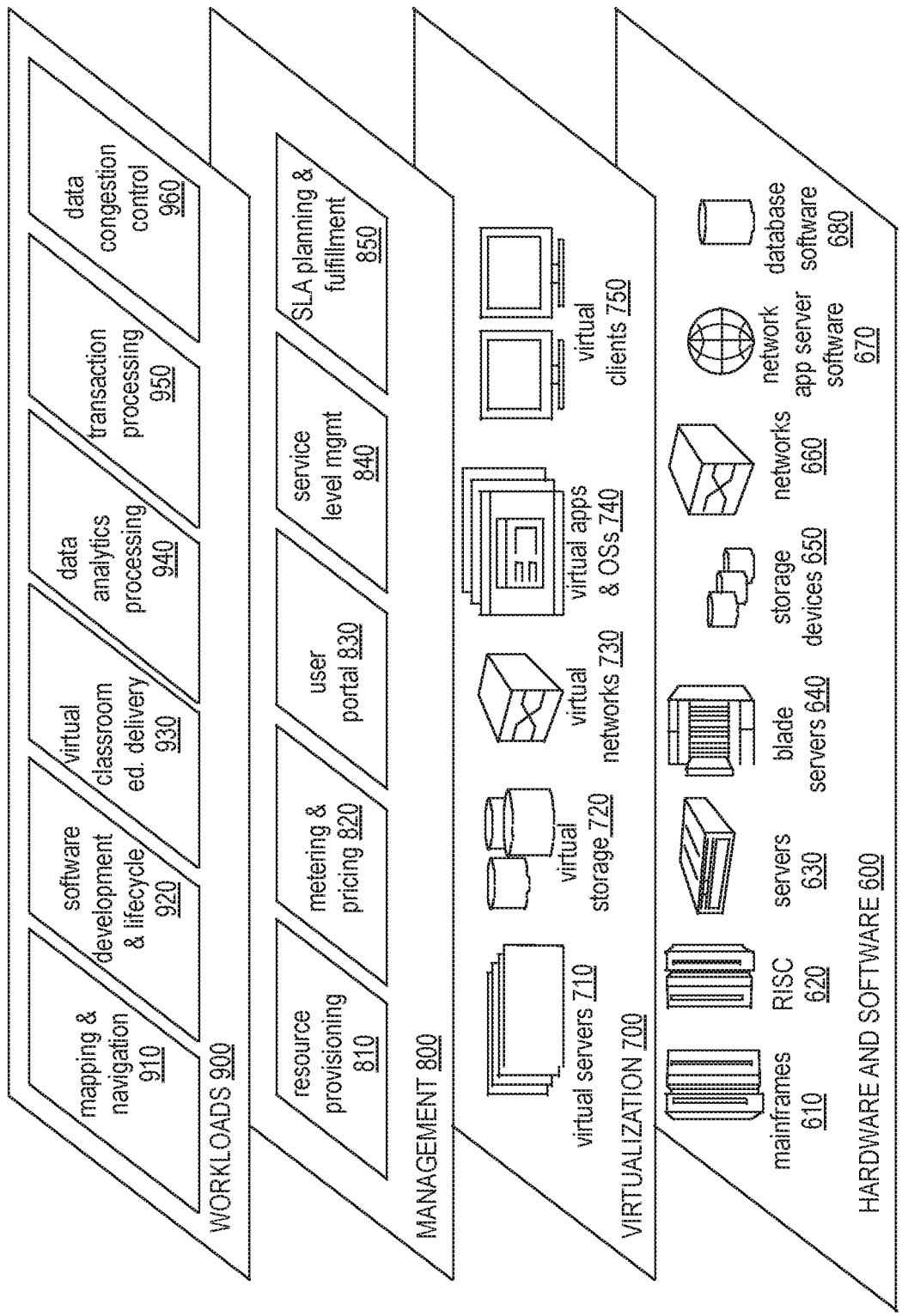
FIG. 7 depicts abstraction model layers according to various embodiments of the present invention.

Referring now to FIG. 7, a set of functional abstraction layers provided by cloud computing environment 500 (FIG.

6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 600 includes hardware and software components. Examples of hardware components include: mainframes 610; RISC (Reduced Instruction Set Computer) architecture based servers 620; servers 630; blade servers 640; storage devices 650; and networks and networking components 660. In some embodiments, software components include network application server software 670 and database software 680. In some embodiments, one or more hardware components can be implemented by utilizing the computing device 300 of FIG. 8.

Virtualization layer 700 provides an abstraction layer from which the following examples of virtual entities may be provided: virtual servers 710; virtual storage 720; virtual networks 730, including virtual private networks; virtual applications and operating systems 740; and virtual clients 750.

In one example, management layer 800 may provide the functions described below. Resource provisioning 810 provides dynamic procurement of computing resources and other resources that are utilized to perform tasks within the cloud computing environment. Metering and Pricing 820 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 830 provides access to the cloud computing environment for consumers and system administrators. Service level management 840 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 900 provides examples of functionality for which the cloud computing environment may be utilized. Examples of workloads and functions which may be provided from this layer include: mapping and navigation 910; software development and lifecycle management 920; virtual classroom education delivery 930; data analytics processing 940; transaction processing 950; and data congestion control 960.

Figure 8:
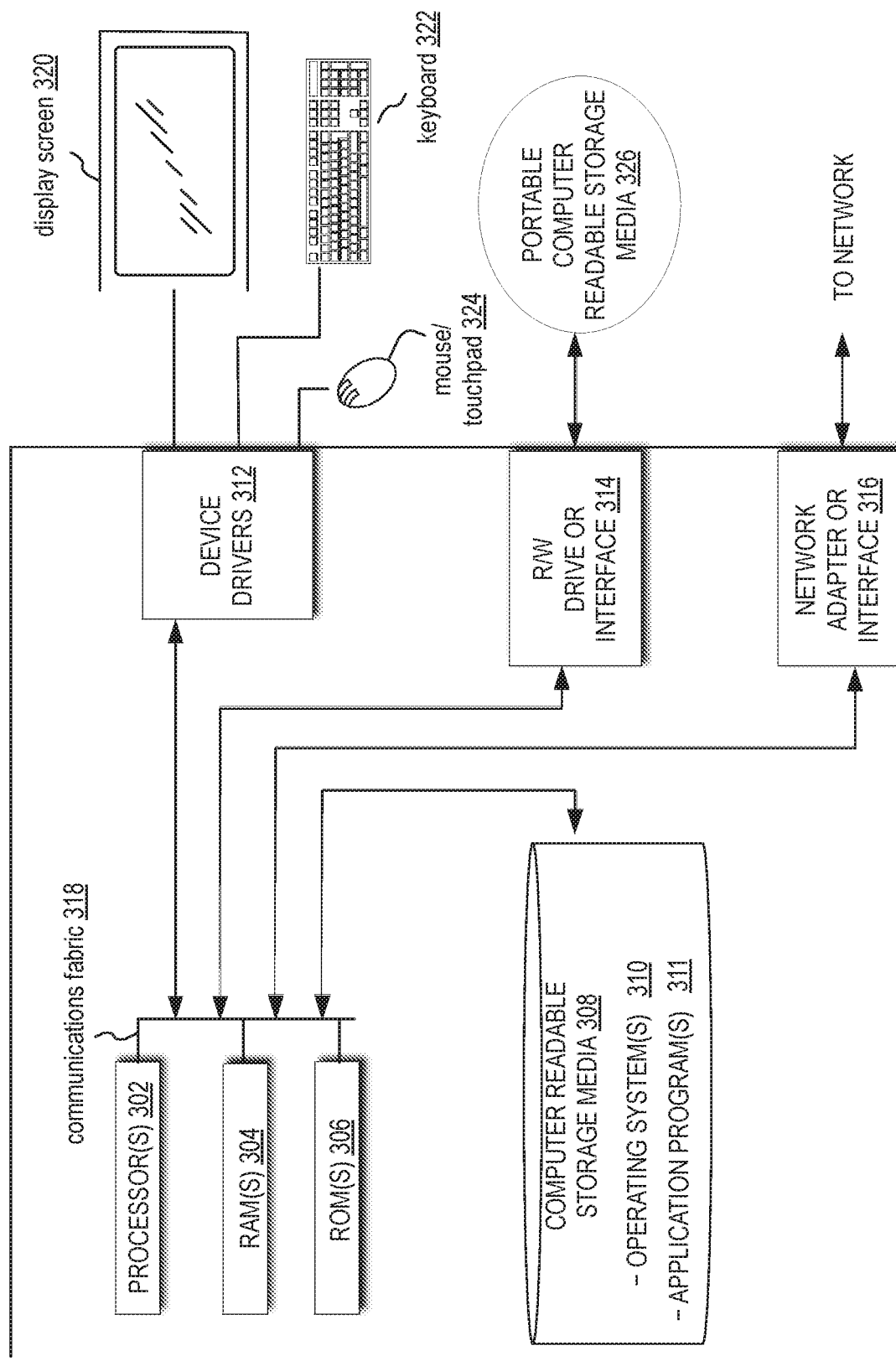
FIG. 8 depicts a block diagram of a computing device according to various embodiments of the present invention.

FIG. 8 depicts a block diagram of components of a computing device 300, which can be utilized to implement some or all of the cloud computing nodes 510, some or all of the computing devices 554A-N of FIG. 6, and/or to implement other computing devices described herein in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device 300 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310 and/or application programs 311, such as network application server software 670 and database software 680, are stored on one or more of the computer readable storage media 308 for execution by one or more of the processors 302 via one or more of the respective RAMs 304 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 300 can also include a R/W drive or interface 314 to read from and write to one or more portable computer readable storage media 326. Application programs 311 on computing devices 300 can be stored on one or more of the portable computer readable storage media 326, read via the respective R/W drive or interface 314 and loaded into the respective computer readable storage media 308.

Computing device 300 can also include a network adapter or interface 316, such as a TCP/IP adapter card or wireless communication adapter. Application programs 311 on computing devices 554A-N can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computing device 300 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

All trademarks used herein are the property of their respective owners. Reference herein to any specific commercial products, process, or service by trade name, trademark, manufacturer, or otherwise, does not necessarily constitute or imply its endorsement, recommendation, or favoring with respect to the embodiments of the present disclosure.

What is claimed is:

1. A method comprises:
   establishing, by a computing device affiliated with a communication network, parameters and objectives for a digital communication session regarding a topic, wherein a plurality of computing devices affiliated with the communication network are participants in the digital communication session, and wherein the digital communication session is off-chain;
   obtaining, by the computing device, data pertaining to the digital communication session and execution thereof, wherein one or more of the plurality of computing devices provides the data;
   generating, by the computing device, a summarization of the digital communication session based on the data and in accordance with the parameters and objectives;
   sending, by the computing device, a request to at least some of the plurality of the computing devices to validate the summarization;
   when a desired number of the at least some of the plurality of computing devices have validated the summarization, generating, by the computing device, a data block regarding the digital communication session and the summarization;
   determining, by the computing device, whether a blockchain exists for the topic; and
   when a blockchain exists for the topic:
      updating, by the computing device, the blockchain to include the data block; and
   when the blockchain does not exist for the topic:
      obtaining, by the computing device, a new blockchain for the topic including the data block.

2. The method of claim 1, wherein the generating the summarization further comprises:
   generating, by the computing device, a plurality of different iterations of summarizations of the digital communication session based on the data and in accordance with the parameters and objectives;
   receiving, by the computing device, selection of one of the iterations of the plurality of different iterations from the at least some of the plurality of the computing devices; and
   when a consensus number for a particular iteration of the plurality of different iterations is met, setting, by the computing device, the particular iteration to the summarization.

3. The method of claim 2 further comprises:
   when a consensus number of selections for a particular iteration of the plurality of different iterations is not met, modifying, by the computing device, the plurality of different iterations of summarizations; and
   when a consensus number for a modified iteration of the modified plurality of different iterations is met, setting, by the computing device, the modified iteration to the summarization.

4. The method of claim 1 further comprises:
   when a desired number of the at least some of the plurality of computing devices have not validated the summarization:
      generating, by the computing device, a modified summarization of the digital communication session based on the data and in accordance with the parameters and objectives and retry logic;
      sending, by the computing device, a request to the at least some of the plurality of the computing devices to validate the modified summarization;
      when a desired number of the at least some of the plurality of computing devices have validated the modified summarization, generating, by the computing device, a different data block regarding the digital communication session and the modified summarization; and
      updating, by the computing device, the blockchain to include the different data block.

5. The method of claim 1 further comprises:
   generating the data block includes:
      generating, by the computing device, a header section and a transaction section of the data block, wherein the transaction section includes information regarding one or more of the digital communication session and the summarization; and
   updating the blockchain includes:
      adding, by the computing device, the data block to the blockchain via a secure chain of custody to reflect an updated blockchain that includes the data block; and
      publishing, by the computing device, the updated blockchain to the communication network.

6. The method of claim 1, wherein the summarization comprises one or more of:
   an attendee list;
   topic information;
   the parameters;
   the objectives;
   session data;
   items agreed to;
   items not agreed to;
   follow up action items;
   a next digital communication session regarding the topic; and
   information regarding the next digital communication session.

7. A computing device affiliated with a communication network, the computing device comprises:
   an interface;
   memory; and
   a processing module operably coupled to the memory and the interface, wherein the processing module is operable to:

establish parameters and objectives for a digital communication session regarding a topic, wherein a plurality of computing devices affiliated with the communication network are participants in the digital communication session, and wherein the digital communication session is off-chain;

obtain data pertaining to the digital communication session and execution thereof, wherein one or more of the plurality of computing devices provides the data;

generate a summarization of the digital communication session based on the data and in accordance with the parameters and objectives;

send a request to at least some of the plurality of the computing devices to validate the summarization;

when a desired number of the at least some of the plurality of computing devices have validated the summarization, generate a data block regarding the digital communication session and the summarization;

determine whether a blockchain exists for the topic; and when a blockchain exists for the topic:
  update the blockchain to include the data block; and when the blockchain does not exist for the topic:
  obtain a new blockchain for the topic including the data block.

8. The computing device of claim 7, wherein the processing module is operable to generate the summarization by:

generating a plurality of different iterations of summarizations of the digital communication session based on the data and in accordance with the parameters and objectives;

receiving selection of one of the iterations of the plurality of different iterations from the at least some of the plurality of the computing devices; and when a consensus number for a particular iteration of the plurality of different iterations is met, setting the particular iteration to the summarization.

9. The computing device of claim 8, wherein the processing module is further operable to:

when a consensus number of selections for a particular iteration of the plurality of different iterations is not met, modify the plurality of different iterations of summarizations; and when a consensus number for a modified iteration of the modified plurality of different iterations is met, set the modified iteration to the summarization.

10. The computing device of claim 7, wherein the processing module is further operable to:

when a desired number of the at least some of the plurality of computing devices have not validated the summarization:
  generate a modified summarization of the digital communication session based on the data and in accordance with the parameters and objectives and retry logic;
  send a request to the at least some of the plurality of the computing devices to validate the modified summarization;
  when a desired number of the at least some of the plurality of computing devices have validated the modified summarization, generate a different data block regarding the digital communication session and the modified summarization; and
  update the blockchain to include the different data block.

11. The computing device of claim 7, wherein the processing module is further operable to:

generate the data block by:
  generating a header section and a transaction section of the data block, wherein the transaction section includes information regarding one or more of the digital communication session and the summarization; and update the blockchain by:
  adding the data block to the blockchain via a secure chain of custody to reflect an updated blockchain that includes the data block; and publishing the updated blockchain to the communication network.

12. A computer readable memory comprises:

a first memory that stores operational instructions that, when executed by a computing device affiliated with a communication network, causes the computing device to:

establish parameters and objectives for a digital communication session regarding a topic, wherein a plurality of computing devices affiliated with the communication network are participants in the digital communication session, and wherein the digital session is off-chain;

obtain data pertaining to the digital communication session and execution thereof, wherein one or more of the plurality of computing devices provides the data;

generate a summarization of the digital communication session based on the data and in accordance with the parameters and objectives;

send a request to at least some of the plurality of the computing devices to validate the summarization;

when a desired number of the at least some of the plurality of computing devices have validated the summarization, generate a data block regarding the digital communication session and the summarization;

determine whether a blockchain exists for the topic; and when a blockchain exists for the topic:
  update the blockchain to include the data block; and when a blockchain does not exist for the topic:
  obtain a new blockchain for the topic including the data block.

13. The computer readable memory of claim 12, wherein the first memory further stores operational instructions that, when executed by the computing device, causes the computing device to generate the summarization by:

generating a plurality of different iterations of summarizations of the digital communication session based on the data and in accordance with the parameters and objectives;

receiving selection of one of the iterations of the plurality of different iterations from the at least some of the plurality of the computing devices; and when a consensus number for a particular iteration of the plurality of different iterations is met, setting the particular iteration to the summarization.

14. The computer readable memory of claim 13, wherein the first memory further stores operational instructions that, when executed by the computing device, causes the computing device to:

when a consensus number of selections for a particular iteration of the plurality of different iterations is not met, modify the plurality of different iterations of summarizations; and when a consensus number for a modified iteration of the modified plurality of different iterations is met, set the modified iteration to the summarization.

15. The computer readable memory of claim 12, wherein the first memory further stores operational instructions that, when executed by the computing device, causes the computing device to:

when a desired number of the at least some of the plurality of computing devices have not validated the summarization:

generate a modified summarization of the digital communication session based on the data and in accordance with the parameters and objectives and retry logic;

send a request to the at least some of the plurality of the computing devices to validate the modified summarization;

when a desired number of the at least some of the plurality of computing devices have validated the modified summarization, generate a different data block regarding the digital communication session and the modified summarization; and update the blockchain to include the different data block.

16. The computer readable memory of claim 12, wherein the first memory further stores operational instructions that, when executed by the computing device, causes the computing device to:

generate the data block by:

generating a header section and a transaction section of the data block, wherein the transaction section includes information regarding one or more of the digital communication session and the summarization; and update the blockchain by:

adding the data block to the blockchain via a secure chain of custody to reflect an updated blockchain that includes the data block; and publishing the updated blockchain to the communication network.

* * * * *